United States Patent
Yoshikawa

(10) Patent No.: US 10,811,041 B2
(45) Date of Patent: Oct. 20, 2020

(54) MAGNETIC DISK DRIVE INCLUDING ACTUATOR ASSEMBLY, FLEXIBLE PRINT CIRCUIT BOARD AND CONTROL CIRCUIT BOARD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Norio Yoshikawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/561,405

(22) Filed: Sep. 5, 2019

(65) Prior Publication Data

US 2020/0211587 A1 Jul. 2, 2020

(30) Foreign Application Priority Data

Dec. 27, 2018 (JP) .................................. 2018-245400

(51) Int. Cl.
*G11B 5/48* (2006.01)

(52) U.S. Cl.
CPC .......... *G11B 5/4846* (2013.01); *G11B 5/4813* (2013.01)

(58) Field of Classification Search
CPC ............................ G11B 5/5578; G11B 5/4813
See application file for complete search history.

(56) References Cited

U.S. PATENT DOCUMENTS

| 5,357,386 | A | * | 10/1994 | Haidari | ................ | G11B 5/4846 360/99.18 |
| 5,477,401 | A | | 12/1995 | Squires et al. | | |
| 5,541,787 | A | * | 7/1996 | Jabbari | ................ | G11B 5/4846 310/71 |
| 5,717,541 | A | * | 2/1998 | Yeas | ...................... | G11B 21/02 360/264.2 |
| 6,021,025 | A | * | 2/2000 | Komura | ................. | G11B 5/486 360/266.3 |
| 6,057,982 | A | * | 5/2000 | Kloeppel | ............. | G11B 25/043 360/99.25 |
| 6,129,579 | A | * | 10/2000 | Cox | ..................... | G11B 5/4846 439/493 |
| 6,168,459 | B1 | * | 1/2001 | Cox | ..................... | G11B 5/4846 439/495 |

(Continued)

FOREIGN PATENT DOCUMENTS

JP 2002-324371 A 11/2002

*Primary Examiner* — Brian E Miller
(74) *Attorney, Agent, or Firm* — White & Case LLP

(57) ABSTRACT

According to one embodiment, a magnetic disk device includes a housing that includes a bottom wall, a magnetic disk contained in the housing, a first head and a second head configured to write data to the magnetic disk, and read data from the magnetic disk, a first actuator assembly including the first head, a second actuator assembly including the second head, a first flexible print circuit board including a first connector, a second flexible print circuit board including a second connector, and a control circuit board that is provided outside the housing, and includes a third connector electrically connected to the first connector and the second connector.

12 Claims, 11 Drawing Sheets

(56) References Cited

U.S. PATENT DOCUMENTS

| | | | | |
|---|---|---|---|---|
| 6,678,112 | B1* | 1/2004 | Kaneko | G11B 5/4846 |
| | | | | 360/99.18 |
| 6,690,549 | B1 | 2/2004 | Aikawa et al. | |
| 6,970,322 | B2* | 11/2005 | Bernett | G11B 25/043 |
| | | | | 360/245.9 |
| 8,059,364 | B1* | 11/2011 | Andrikowich | G11B 33/1466 |
| | | | | 360/99.22 |
| 9,672,870 | B1* | 6/2017 | Mizumoto | G11B 25/043 |
| 9,721,619 | B2* | 8/2017 | Sudo | G11B 25/043 |
| 9,886,985 | B1* | 2/2018 | Okamoto | G11B 33/027 |
| 10,162,393 | B2* | 12/2018 | Fruge | G06F 1/187 |
| 10,332,555 | B1* | 6/2019 | Keshavan | G11B 19/2018 |
| 10,424,345 | B1* | 9/2019 | Namihisa | G11B 25/043 |
| 10,446,180 | B1* | 10/2019 | Kraus | G11B 5/4813 |
| 2006/0050429 | A1* | 3/2006 | Gunderson | G11B 25/043 |
| | | | | 360/99.21 |
| 2008/0144273 | A1* | 6/2008 | Mewes | G11B 33/122 |
| | | | | 361/679.37 |
| 2017/0294737 | A1* | 10/2017 | Horchler | H01R 13/521 |
| 2018/0358038 | A1* | 12/2018 | Keshavan | G11B 5/4813 |
| 2019/0074615 | A1* | 3/2019 | Okamoto | G11B 33/1466 |
| 2019/0295578 | A1* | 9/2019 | Kraus | G11B 5/481 |

* cited by examiner

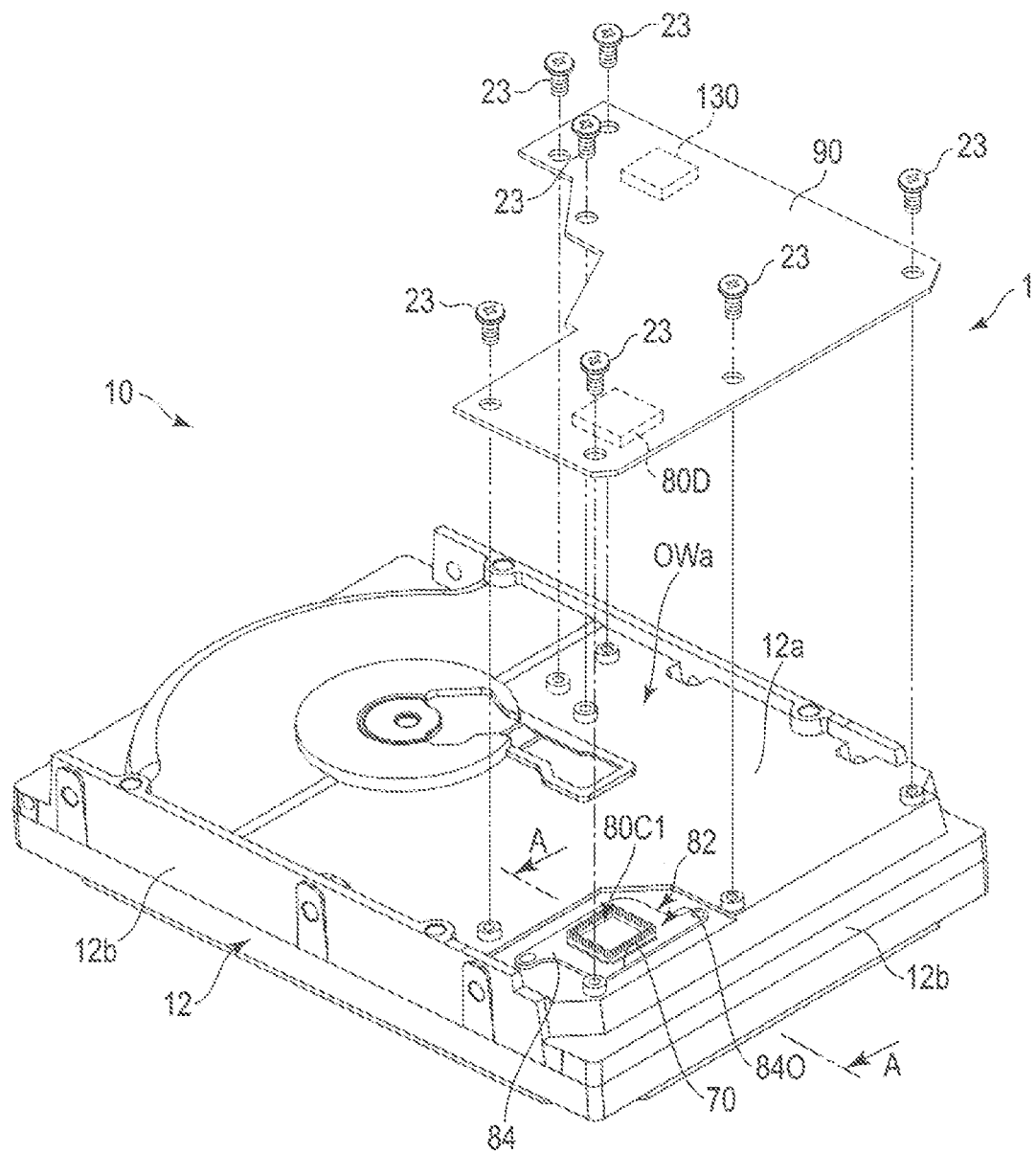
F I G. 2

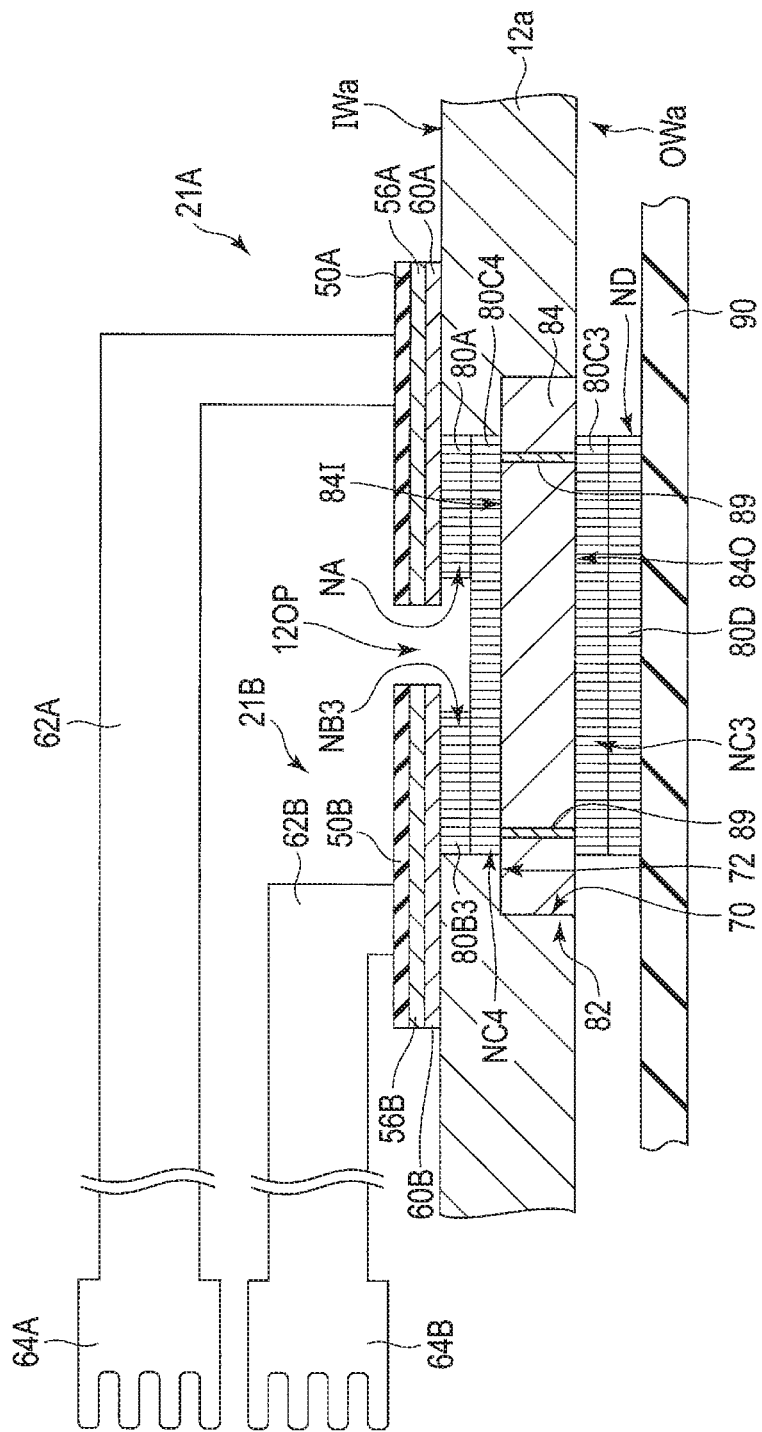
F I G. 10

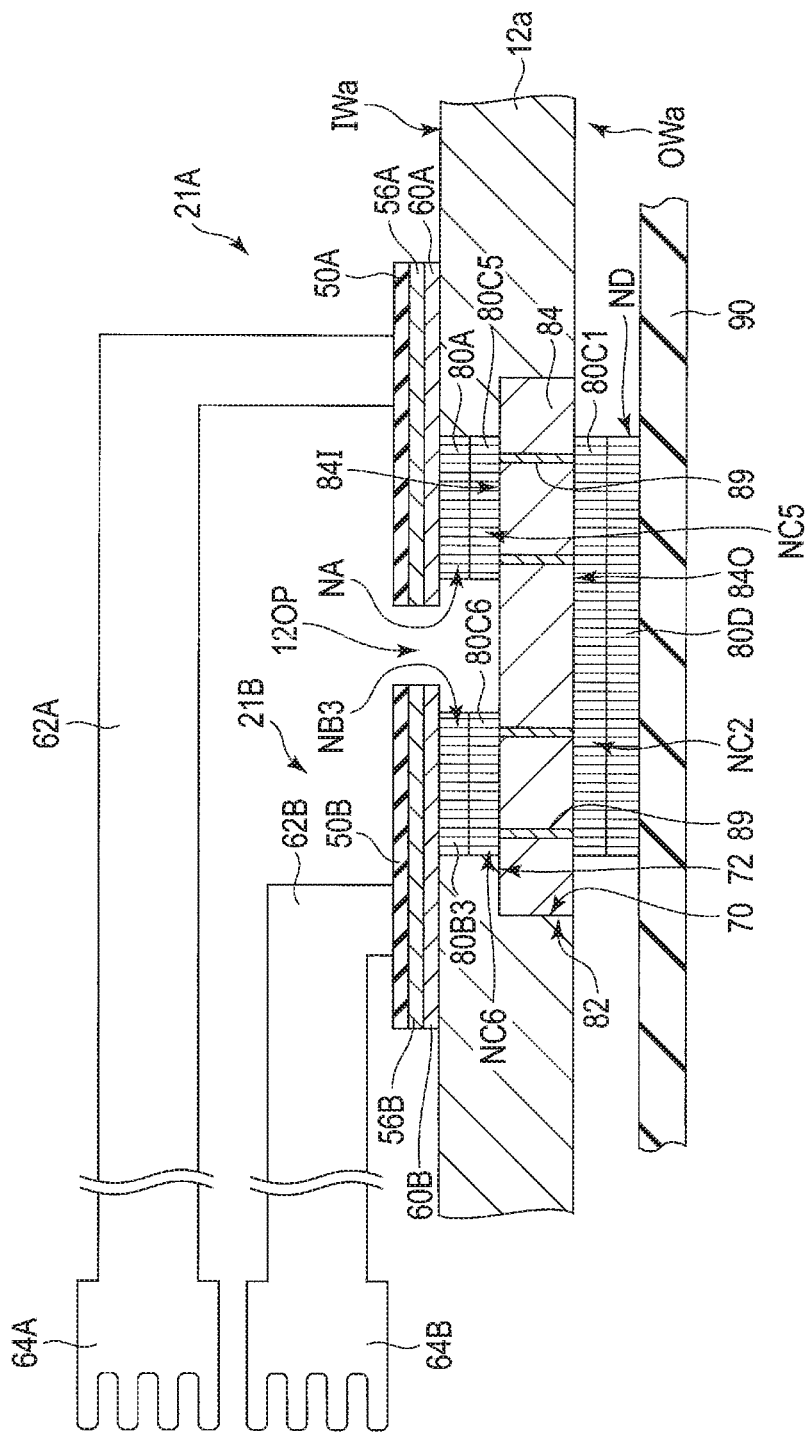
F I G. 11

MAGNETIC DISK DRIVE INCLUDING ACTUATOR ASSEMBLY, FLEXIBLE PRINT CIRCUIT BOARD AND CONTROL CIRCUIT BOARD

CROSS-REFERENCE TO RELATED APPLICATIONS

This application is based upon and claims the benefit of priority from Japanese Patent Application No. 2018-245400, filed Dec. 27, 2018, the entire contents of which are incorporated herein by reference.

FIELD

Embodiments described herein relate generally to a magnetic disk drive.

BACKGROUND

Recently, the number of magnetic disks has increased according to an increase in recording capacity of a magnetic disk drive. In order to respond to an increase in the magnetic disk, a magnetic disk drive including a so-called dual actuator assembly in which a plurality of, for example, two head actuator assemblies are arranged by being stacked has been proposed.

The magnetic disk drive includes a magnetic disk provided inside a housing, a spindle motor that supports and rotationally drives the magnetic disk, a plurality of actuator assemblies that support the magnetic head, a bearing unit that turnably (rotatably) mounts the plurality of actuator assemblies, a plurality of voice coil motors that drive each of the plurality of actuator assemblies around the bearing unit, a flexible print circuit (FPC) board unit (hereinafter, referred to as an FPC unit), and the like.

In the assembling or a manufacturing step of the magnetic disk drive such as a case where in the plurality of actuator assemblies respectively mounting a plurality of FPCs that branch from one FPC unit, a suspension is attached to the actuator assembly, or a case where the plurality of actuator assemblies respectively mounting the plurality of FPCs that branch from one FPC unit are attached to the hearing unit, a head suspension may be deformed.

In addition, in a case where the plurality of actuator assemblies are secured to the bearing unit, and then, the plurality of FPCs that branch from one FPC unit are respectively attached to the plurality of actuator assemblies, it can be difficult to bond the FPC that branches from one FPC unit to the actuator assembly with solder, and then, to wash the actuator assembly.

BRIEF DESCRIPTION OF THE DRAWINGS

FIG. 2 is a perspective view illustrating one configuration example of a back surface of a housing and a control circuit board.

FIG. 10 is a sectional view pictorially illustrating one configuration example of an FPC unit, a connector unit, and a control circuit board according to Modification Example 1.

FIG. 11 is a sectional view pictorially illustrating one configuration example of an FPC unit, a connector unit, and a control circuit board according to Modification Example 2.

DETAILED DESCRIPTION

In general, according to one embodiment, a magnetic disk drive, comprises: a housing that includes a bottom wall; a magnetic disk that is contained in the housing; a first head and a second head configured to write data to the magnetic disk, and read data from the magnetic disk; a first actuator assembly that is provided inside the housing, and includes the first head; a second actuator assembly that is positioned between the bottom wall and the first actuator assembly in the housing, and includes the second head; a first flexible print circuit board that is electrically connected to the first actuator assembly in the housing, and includes a first connector; a second flexible print circuit board that is electrically connected to the second actuator assembly in the housing, and includes a second connector; and a control circuit board that is provided outside the housing, and includes a third connector electrically connected to the first connector and the second connector.

Hereinafter, an embodiment will be described with reference to the drawings. Furthermore, the drawings are an example, and do not limit the scope of the invention.

Embodiment

Figure 1:
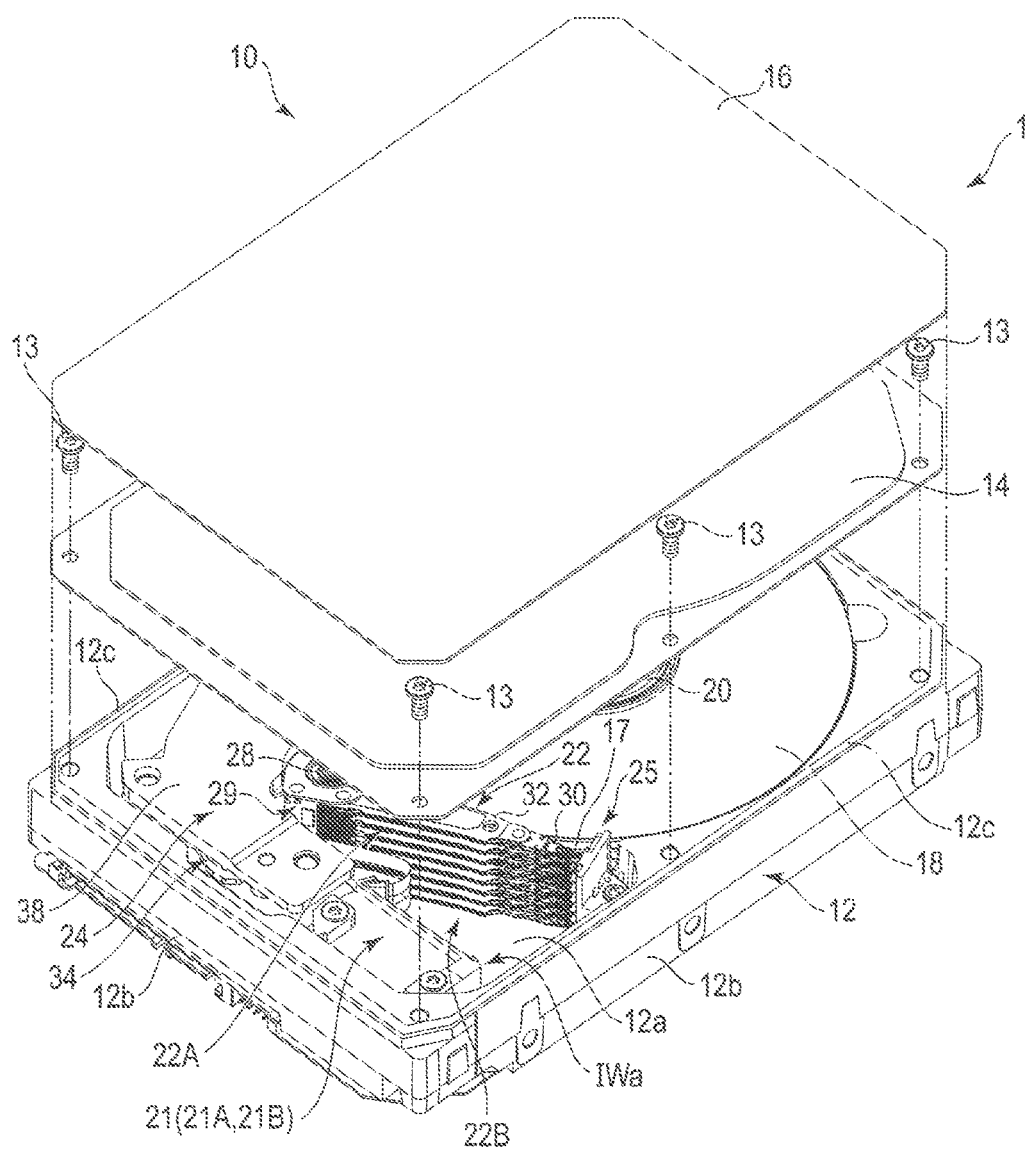
FIG. 1 is an exploded perspective view illustrating an example of an internal structure of a magnetic disk drive according to an embodiment.

FIG. 1 is an exploded perspective view illustrating an example of an internal structure of a magnetic disk drive 1 according to an embodiment.

The magnetic disk drive 1 includes an approximately rectangular housing 10. The housing 10 includes an open rectangular box-like base 12, an inner cover 14 that is screwed to the base 12 by a plurality of screws 13, and blocks an opening of the base 12, and an outer cover (top cover) 16 overlappingly arranged on the inner cover 14 in which a periphery portion is welded to the base 12. Hereinafter, a direction towards the inner cover 14 and the outer cover 16 will be referred to as an upper portion (or simply referred to as upper), and a direction opposite to an upper direction will be referred to as a lower portion (or simply referred to as lower). In addition, there is a case where the direction towards the inner cover 14 or the outer cover 16 is referred to as the cover side. The base 12 includes a rectangular bottom wall 12a facing the inner cover 14 with a gap, and a sidewall 12b that is erected along the periphery of the bottom wall 12a. In the base 12, for example, the bottom wall 12a, the sidewall 12b, and the like are integrally molded with aluminum. The sidewall 12b includes a pair of long side walls facing each other, and a pair of short side walls facing each other. An approximately rectangular frame-like fixing rib 12c protrudes to an upper end surface of the sidewall 12*b*. Hereinafter, there is a case where a direction towards the bottom wall 12*a* is referred to as the bottom wall side.

The inner cover 14, for example, is formed into the shape of a rectangular plate with stainless steel. The inner cover 14 is secured to the inside of the fixing rib 12*c* by screwing the periphery portion onto the upper surface of the sidewall 12*b* of the base 12 with the screw 13. The outer cover 16 faces the inner cover 14 on a side opposite to the bottom wall 12*a* of the base 12. The outer cover 16, for example, is formed into the shape of a rectangular plate with aluminum. The outer cover 16 is formed to have a planar dimension that is slightly larger than that of the inner cover 14. The outer cover 16 is welded and airtightly secured to the fixing rib 12*c* of the base 12 over the entire periphery portion. The housing 10 is sealed with low density gas (inert gas) of which the density is lower than that of the air, for example, helium.

A plurality of, for example, five to nine magnetic disks (hereinafter, simply referred to as a disk) 18 as a recording medium, and a spindle motor 20 as a driving unit that supports and rotates the disk 18 are provided inside the housing 10. The spindle motor 20 is provided on the bottom wall 12*a* (an inner surface IWa of the bottom wall 12*a*). Each of the disks 18 includes a magnetic recording layer on the upper surface and/or the lower surface. Each of the disks 18 coaxially fitted into a hub (not illustrated) of the spindle motor 20, is clamped by a clamp spring, and is secured to the hub. Accordingly, each of the disks 18 is supported in a state of being positioned in parallel to the bottom wall 12*a* of the base 12. The disk 18 is rotated at a particular number of rotations by the spindle motor 20.

Furthermore, in the present embodiment, five to nine disks 18 are contained in the housing 10, but the number of disks 18 is not limited thereto. In addition, a single disk 18 may be in the housing 10.

A plurality of magnetic heads (hereinafter, simply referred to as a head) 17 performing recording and reproducing of information with respect to disk 18, and an actuator assembly (actuator) 22 in which the head 17 is movably supported with respect to the disk 18 are provided inside the housing 10. In the present embodiment, the head actuator assembly 22 is configured as a plurality of actuator assemblies, for example, a dual actuator assembly including an actuator assembly 22A and an actuator assembly 22B. The actuator assemblies 22A and 22B are turnably supported around a common bearing unit 28. The bearing unit 28 includes a pivot shaft that is erected on the bottom wall 12*a* of the base 12 in the vicinity of the outer periphery of the disk 18, a plurality of bearings that are attached to the pivot shaft, a spacer arranged between the bearings, and the like.

Further, a voice coil motor (hereinafter, referred to as a VCM) 24 that controls an operation such as turning or positioning the actuator assemblies 22A and 22B, a ramped loading mechanism 25 that holds the head 17 separated from the disk 18 in an unload position when the head 17 is moved to the outermost circumference of the disk 18, and a board unit (FPC unit) 21 are provided inside the housing 10. The FPC unit 21 includes a plurality of FPC units, for example, the same number of FPC units as that of the head actuator assemblies. For example, the FPC unit 21 includes an FPC unit 21A and an FPC unit 21B. The FPC units 21A and 21B are electrically connected to the actuator assemblies 22A and 22B, respectively. The FPC units 21A and 21B include flexible print circuit (FPC) boards, respectively. The FPC boards are electrically connected to the head 17 and a voice coil 34 of the VCM 24 through a relay FPC on the actuator assemblies 22A and 22B, respectively. The voice coil 34 is positioned between a pair of yokes 38, and configures the VCM 24 along with the yokes 38, and a magnet that is secured to any yoke 38. Furthermore, in the FPC unit 21, the number of FPC units may be identical to or different from the number of head actuator assemblies.

The actuator assemblies 22A and 22B include an actuator block 29, the bearing unit 28 provided in the actuator block 29, a plurality of arms 32 extending from the actuator block 29, and a suspension assembly (suspension) 30 extending from each of the arms 32, respectively. The head 17 is supported on the distal portion of each of the suspension assemblies 30. The actuator assembly 22 moves the head 17 to a particular position of the disk 18 by the driving of the VCM 24.

FIG. 2 is a perspective view illustrating one configuration example of the back surface of the housing 10 and a control circuit board 90.

Further, a connector unit 82 and a print circuit board (the control circuit board) 90 are provided outside the housing 10.

The connector unit 82 is mounted on an outer surface (bottom surface) OWa of the bottom wall 12*a* of the base 12. The connector unit 82 includes a connector 80C1, a connector 80C2 described below, and a sealing board 84 on which connectors 80C1 and 80C2 are mounted. The connector 80C1 is provided on one surface (an outer surface) 84O of the sealing board 84. The connector 80C1 is electrically connected to the FPC unit 21. The sealing board 84 is fitted into an approximately rectangular concave portion 70 that is formed on the outer surface OWa of the bottom wall 12*a*.

In addition, the control circuit board 90 is screwed to the outer surface OWa of the bottom wall 12*a* of the base 12 by a plurality of screws 23. The control circuit board 90 faces the outer surface OWa. An insulating sheet or a vibration reduction cushion sheet having insulating properties (not illustrated) as an insulating member is arranged between the outer surface OWa of the bottom wall 12*a* of the base 12 and the control circuit board 90. An electronic component such as a semiconductor chip, a connector 80D, and a controller (controller) 130 is mounted on the inner surface of the control circuit board 90 surface of the bottom wall 12*a* of the base 12 on a side facing the outer surface OWa). The connector 80D is electrically connected to the semiconductor chip, the controller 130, or the like that is mounted on the control circuit board 90. In addition, the connector 80C1 and the connector 80D are electrically connected to each other by being mechanically connected (for example, fitted) to each other. The controller 130 controls the operation of the spindle motor 20, and controls the operation of the head actuator assembly 22 (for example, the VCM 24 and the head 17) through the FPC unit 21.

Figure 3:
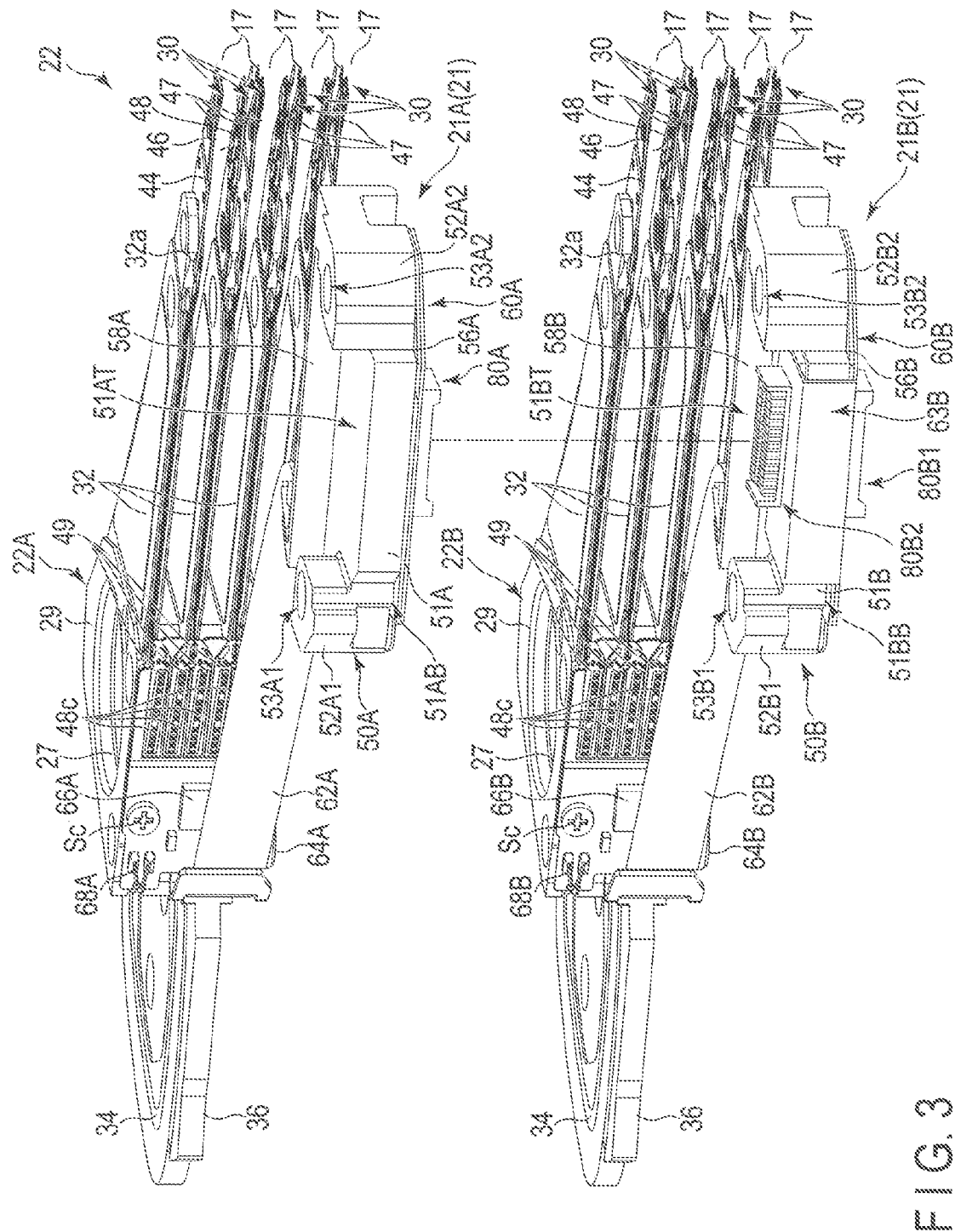
FIG. 3 is a perspective view illustrating one configuration example of an actuator assembly.

FIG. 3 is a perspective view illustrating one configuration example of the actuator assemblies 22A and 22B.

In the example illustrated in FIG. 3, the actuator assemblies 22A and 22B include the actuator block 29 provided with a perforation 27, a plurality of arms 32 extending from the actuator block 29, and a suspension assembly 30 attached to each of the arms 32, respectively. The actuator block 29 and the plurality of arms 32, for example, are integrally molded with aluminum or the like, and configure a so-called E block. The plurality of arms 32, for example, are formed into the shape of an elongated flat plate. The plurality of arms 32 are provided in parallel at separation. Each of the arms 32 includes an extension end 32*a* on a side opposite to the actuator block 29, and the suspension assembly 30 is attached to the extension end 32a. The suspension assembly 30 includes an up-head suspension assembly that upwardly supports the head 17, and a down head suspension assembly that downwardly supports the head 17. The suspension assemblies 30 of the same structure are arranged by changing an up-and-down direction, and thus, the up-head suspension assembly and the down head suspension assembly are configured. The head 17 is supported on each of the suspension assemblies 30 of the actuator assemblies 22A and 22B. The actuator assemblies 22A and 22B include a support frame 36 that extends from the actuator block 29 in a direction opposite to the arm 32, respectively, and the voice coil 34 configuring a part of the VCM 24 is supported on the support frame 36.

Furthermore, in this configuration, in the actuator assemblies 22A and 22B, the same number of arms 32 and head suspension assemblies 30 are arranged, but in the actuator assemblies 22A and 22B, the number of arms 32 may be different from the number of head suspension assemblies 30. In addition, in the actuator assemblies 22A and 22B, the shape and a height direction position of the voice coil 34 may be changed.

The suspension assembly 30 includes an approximately rectangular base plate 44, a load beam 46 including an elongated leaf spring, a pair of piezoelectric elements (PZT element) 47, and elongated strip-like flexure (wiring member) 48 for transferring a write signal, a read signal, and a driving signal of the piezoelectric element 47. A proximal end portion of the base plate 44 is secured to the extension end 32a of the arm 32, for example, caulked. In the load beam 46, the proximal end portion is overlappingly secured to an end portion of the base plate 44. The load beam 46 extends from the base plate 44, and is formed to be tapered. The base plate 44 and the load beam 46, for example, are formed of stainless steel. The piezoelectric element 47 finely controls the operation of the head 17 according to an expansion and contraction operation. Hereinafter, there is a case where a configuration of controlling finely, for example, more finely than the control of the VCM 24 the head 17 including a control system controlling the piezoelectric element 47, the piezoelectric element 47, wiring connecting the control system and the piezoelectric element 47 to each other, and the like is referred to as a microactuator (MA).

The flexure 48 includes a metal plate (backing layer) of stainless steel or the like that is a base, an insulating layer formed into the shape of a metal plate, a conductive layer configuring a plurality of wirings (wiring patterns) formed on the insulating layer, and a protective layer (insulating layer) covering the conductive layer, and forms an elongated strip-like laminate. The flexure 48 includes a distal side portion that is attached onto the surface of the load beam 46 and the base plate 44, and a proximal side portion that extends to the outside from a side edge of the base plate 44, and further extends to the proximal end portion of the arm 32 (a portion of the arm 32 on the actuator block 29 side) along the side edge of the base plate 44 and the arm 32. A displaceable gimbal portion (elastic support portion) is provided in a distal portion of the flexure 48 that is positioned on the load beam 46, and the head 17 is mounted on the gimbal portion. The wiring of the flexure 48 is electrically connected to the head 17. The proximal side portion of the flexure 48 extends to the outside from the side edge of the base plate 44, and then, extends to the proximal end of the arm 32 along the side edge and one side edge of the arm 32. The flexure 48 is formed in a connection end portion 48c of one end of the proximal side portion. The connection end portion 48c is formed into the shape of an elongated rectangle. The connection end portion 48c is folded at a right angle with respect to the proximal side portion, and is approximately perpendicularly positioned with respect to the arm 32. A plurality of connection terminals (connection pads) 49 are arranged in the connection end portion 48c, as an example. The connection terminals 49 are respectively connected to the wirings of the flexure 48. That is, the plurality of wirings of the flexure 48 extend over the approximately entire length of the flexure 48, one end is electrically connected to the head 17, and the other end connected to the connection terminal (connection pad) 49 of the connection end portion 48c.

The plurality of actuator assemblies 22 are respectively connected to different FPC units 21. The plurality of FPC unit 21 respectively include at least one connector. In the example illustrated in FIG. 3, the actuator assemblies 22A and 22B are respectively connected to the FPC units 21A and 21B. The FPC unit 21A includes one connector 80A, and the FPC unit 21B includes two connectors 80B1 and 80B2.

In the example illustrated in FIG. 3, the FPC unit 21A integrally includes an approximately rectangular base portion 60A, an elongated strip-like relay portion 62A extending from one side edge of the base portion 60A, and an approximately rectangular bonding portion 64A continuously provided in a distal portion of the relay portion 62A. The base portion 60A, the relay portion 62A, and the bonding portion 64A are formed of an FPC board. The FPC board includes an insulating layer of polyimide or the like, a conductive layer that is formed on the insulating layer, and forms wiring, a connection pad, and the like, and a protective layer covering the conductive layer.

An electronic component such as a plurality of capacitors (not illustrated), and a connector 80A is mounted on one surface (an outer surface) of the base portion 60A, and is electrically connected to wiring or the like (not illustrated). Metal plates 56A and 58A that function as a reinforcing plate are respectively affixed onto the other surface (an inner surface) of the base portion 60A. The base portion 60A is folded at 90 degrees in a portion between the metal plate 56A and the metal plate 58A. In addition, a pedestal 50A formed of a resin or the like is provided on the metal plate 56A. The pedestal 50A includes a main body portion 51A, and protrusions 52A1 and 52A2 that protrude above the main body portion 51A, that is, to the cover (the inner cover 14 and the outer cover 16) side. The main body portion 51A includes a surface (upper surface) 51AT on the cover side, and a rear surface (lower surface) 51AB on a side opposite to the surface 51AT. The protrusions 52A1 and 52A2 are provided on the surface 51AT side. In the protrusion 52A1, a through-hole 53A1 that penetrates from the upper surface of the protrusion 52A1 to the base portion 60A is formed. In the protrusion 52A2, a through-hole 53A2 that penetrates from the upper surface of the protrusion 52A2 to the base portion 60A is formed. The rear surface 51AB faces the metal plate 56A. For example, the rear surface 51AB adheres to the metal plate 56A.

The relay portion 62A extends from the base portion 60A towards the actuator assembly 22A. The bonding portion 64A is provided on an extension end of the relay portion 62A. The bonding portion 64A is formed into the shape of a rectangle having approximately the same width as the height (thickness) of the actuator block 29. The bonding portion 64A includes a plurality of connection pad groups corresponding to the connection end portions 48c of the flexures 48. A head IC 66A is mounted on the bonding portion 64A. The head IC 66A is connected to the connection pad group and the FPC unit 21A through wiring. Further, the bonding portion 64A includes a connection pad 68A for connecting the voice coil 34. A backing plate, for example, formed of aluminum, is affixed onto the inner surface (rear surface) of the bonding portion 64A, as a reinforcing plate. The backing plate is formed to have approximately the same shape and dimension as those of the bonding portion 64A, and is affixed to approximately the entire bonding portion 64A.

In the bonding portion 64A configured as described above, the backing plate side is affixed to a lateral surface (installation surface) of the actuator block 29, and is secured onto the installation surface by a fix screw Sc. The connection end portions 48*c* of each of the flexures 48 are drawn to the installation surface side of the actuator block 29, and are bonded to the bonding portion 64A. In addition, the wiring of the voice coil 34 is connected to the connection pad 68A of the bonding portion 64A.

Furthermore, in this drawing, the backing plate side is secured onto the lateral surface by the fix screw Sc, but may be solder-fixed onto the lateral surface of the actuator block 29 by a pin.

Accordingly, the head 17 that is mounted on the distal end of the actuator assembly 22A is electrically connected to the connector 80A through the wiring and the connection end portion 48*c* of the flexure 48, the bonding portion 64A, the relay portion 62A, and the base portion 60A. Hereinafter, there is a case where the FPC unit 21A, the pedestal 50A, the metal plate 56A, the metal plate 58A, the connector 80A, and the like are collectively referred to as the FPC unit 21A.

In the example illustrated in FIG. 3, the FPC unit 21B integrally includes an approximately rectangular base portion 60B, an elongated strip-like relay portion 62B extending from one side edge of the base portion 60B, a strip-like extension portion 63B extending from one side edge of the base portion 60B that is different from one side edge from which the relay portion 62B extends, and an approximately rectangular bonding portion 64B continuously provided in a distal portion of the relay portion 62B. The base portion 60B, the relay portion 62B, the extension portion 63B, and the bonding portion 64B are formed of an FPC board.

An electronic component such as a plurality of capacitors (not illustrated), and a connector 80B1 is mounted on one surface (an outer surface) of the base portion 60B, and is electrically connected to wiring or the like (not illustrated). Metal plates 56B and 58B that function as a reinforcing plate are respectively affixed onto the other surface (an inner surface) of the base portion 60B. The base portion 60B is folded at 90 degrees in a portion between the metal plate 56B and the metal plate 58B. In addition, a pedestal 50B formed of a resin or the like is provided on the metal plate 56B. The pedestal 50B includes a main body portion 51B, and protrusions 52B1 and 52B2 that protrude above the main body portion 51B, that is, to the cover (the inner cover 14 and the outer cover 16) side. The main body portion 51B includes a surface (upper surface) 51BT on the cover side, and a rear surface (lower surface) 51BB on a side opposite to the surface 51BT. The protrusions 52B1 and 52B2 are provided on the surface 51BT side. In the protrusion 52B1, a through-hole 53B1 that penetrates from the upper surface of the protrusion 52B1 to the base portion 60B is formed. In the protrusion 52B2, a through-hole 53B2 that penetrates from the upper surface of the protrusion 52B2 to the base portion 60B is formed. The rear surface 51BB faces the metal plate 56B. For example, the rear surface 51BB adheres to the metal plate 56B.

The relay portion 62B extends from the side edge of the base portion 60B towards the actuator assembly 22B. The bonding portion 64B is provided on an extension end of the relay portion 62B. The bonding portion 64B is formed into the shape of a rectangle having approximately the same width as the height (thickness) of the actuator block 29. The bonding portion 64B includes a plurality of connection pad groups corresponding to the connection end portions 48*c* of the flexures 48. A head IC 66B is mounted on the bonding portion 64B. The head IC 66B is connected to the connection pad group and the FPC unit 21B through wiring. Further, the bonding portion 64B includes a connection pad 68B for connecting the voice coil 34. A backing plate, for example, formed of aluminum, is affixed onto the inner surface (rear surface) of the bonding portion 64B, as a reinforcing plate. The backing plate is formed to have approximately the same shape and dimension as those of the bonding portion 64B, and is affixed to approximately the entire bonding portion 64B.

In the bonding portion 64B configured as described above, the backing plate side is affixed onto a lateral surface (installation surface) of the actuator block 29, and is secured onto the installation surface by the fix screw Sc. The connection end portions 48*c* of each of the flexures 48 are drawn to the installation surface side of the actuator block 29, and are bonded to the bonding portion 64B. In addition, the wiring of the voice coil 34 is connected to the connection pad 68B of the bonding portion 64B.

Furthermore, in this drawing, the backing plate side is fixed onto the lateral surface by the fix screw Sc, but may be solder-fixed onto the lateral surface of the actuator block 29 by a pin.

The extension portion 63B extends from the side edge of the base portion 60A onto the pedestal 50B. In the example illustrated in FIG. 3, the extension portion 63B extends from the side edge of the base portion 60A on a side opposite to the side edge from which the relay portion 62B extends to the surface 51AT of the main body portion 51B. An electronic component such as a plurality of capacitors (not illustrated), and a connector 80B2 is mounted on one surface (an outer surface) or the extension portion 63B, and is electrically connected to wiring or the like (not illustrated). The other surface (inner surface) of the extension portion 63B faces the lateral surface and the surface 51BT of the main body portion 51B. For example, the extension portion 63B is in contact with the main body portion 51B over the surface 51BT from the main body portion 51B. The connector 80B2 is positioned on the surface 51AT.

Accordingly, the head 17 that is mounted on the distal end of the actuator assembly 22B is electrically connected to the connectors 80B1 and 80B2 through the wiring and the connection end portion 48*c* of the flexure 48, the bonding portion 64B, the relay portion 62B, and the extension portion 63B. Hereinafter, the FPC unit 21B, the pedestal 50B, the metal plate 56B, the metal plate 58B, the connector 80B1, the connector 80B2, and the like are collectively referred to as the FPC unit 21A.

Figure 4:
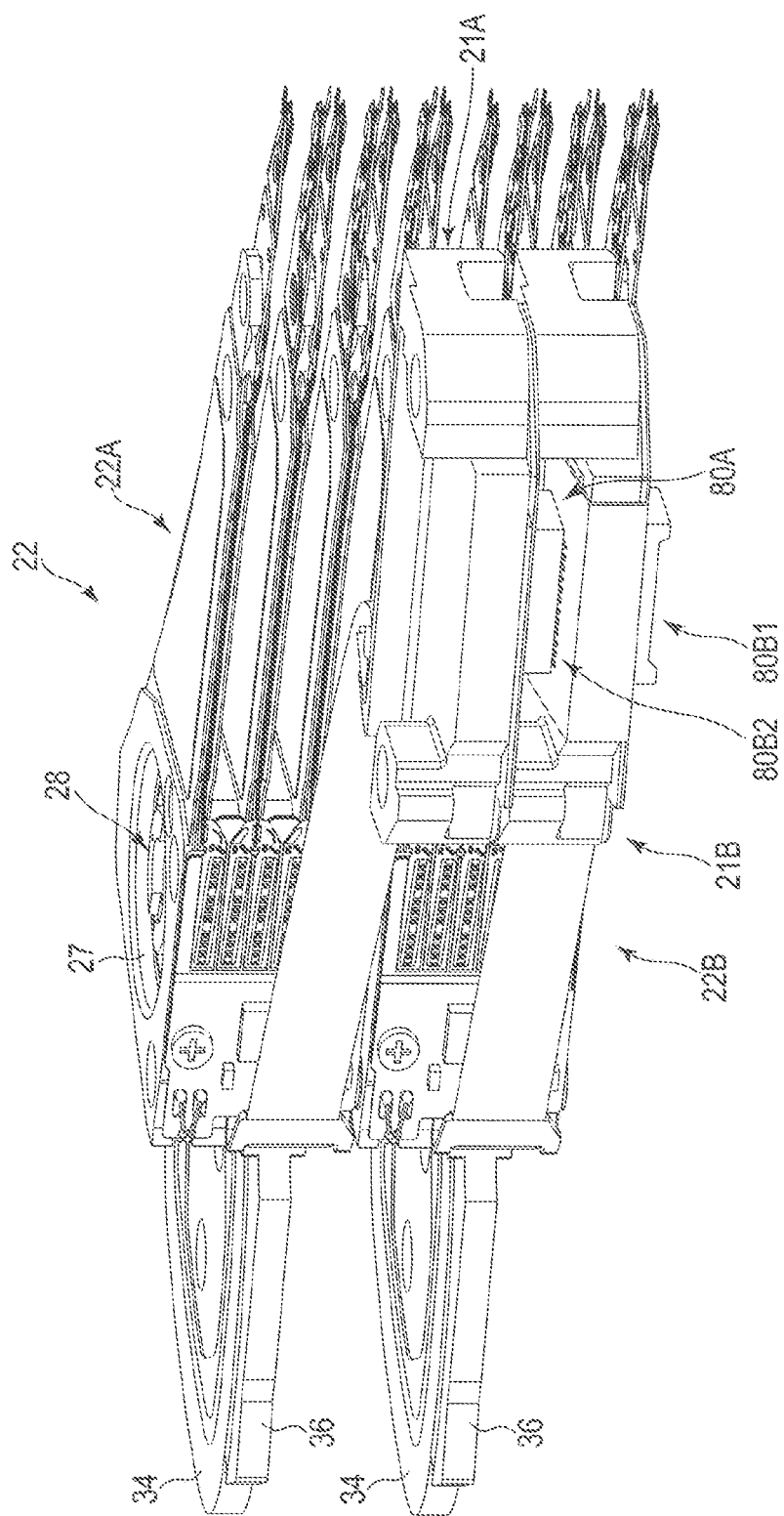
FIG. 4 is a perspective view illustrating one configuration example of the actuator assembly.

FIG. 4 is a perspective view illustrating one configuration example of the actuator assembly 22.

The actuator assemblies 22A and 22B are overlappingly arranged. A plurality of bearings of the bearing unit 28 are fitted into the perforations 27 of the actuator blocks 29 of the actuator assemblies 22A and 22B. The plurality of bearings of the bearing unit 28 are respectively secured to the perforations 27 of the actuator blocks 29 of the actuator assemblies 22A and 22B by an adhesive agent, a screw (not illustrated), or the like. The plurality of bearings secured to the perforations 27 of the actuator assembly 22A and the plurality of bearings secured to the perforations 27 of the actuator assembly 22A are attached to a common pivot shaft (the hearing unit 28) erected on the bottom wall 12a of the base 12, respectively. Accordingly, the actuator assemblies 22A and 22B can be turned independently from each other around the pivot shaft of the bearing unit 28.

In addition, the FPC units 21A and 21B are overlappingly arranged. The connector 80A provided in the base portion 60A of the FPC unit 21A faces the connector 80B2 provided on the extension portion 63B of the FPC unit 21B. The connector 80A and the connector 80B2 are mechanically connected (for example, fitted) to each other, and thus, are electrically connected to each other. In other words, the connector 80A and the connector 80B2 are mechanically connected to each other, and thus, the FPC unit 21A and the FPC unit 21B are electrically connected to each other. For example, in a case where the shapes of the actuator assemblies 22A and 22B are approximately the same, the shapes of the FPC unit 21A and the FPC unit 21B may be approximately the same.

Figure 5:
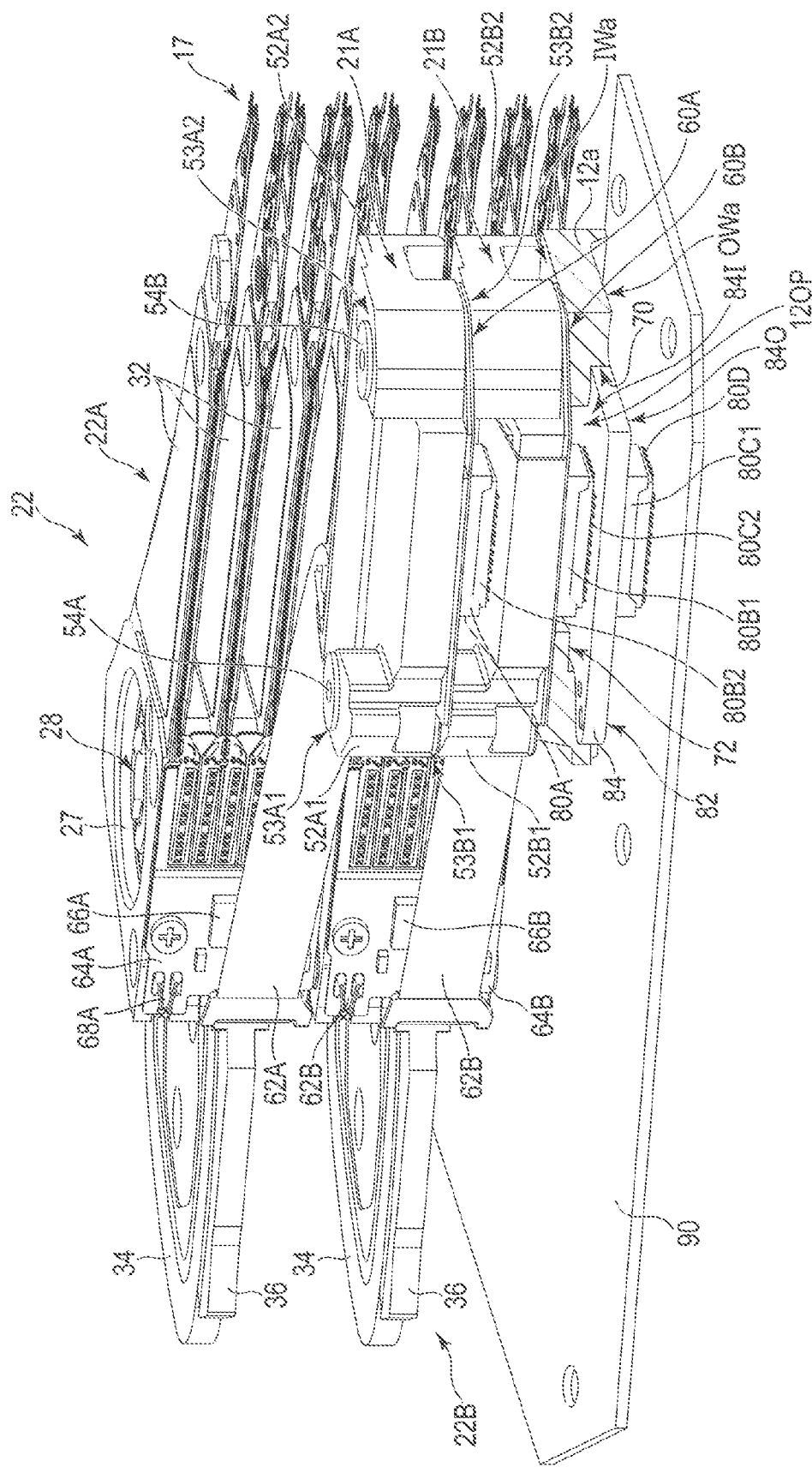
FIG. 5 is a perspective view pictorially illustrating one configuration example of the actuator assembly, a connector unit, and the control circuit board.

FIG. 5 is a perspective view pictorially illustrating one configuration example of the actuator assemblies 22A and 22B, the connector unit 82, and the control circuit board 90. FIG. 5 illustrates a partial sectional view of the bottom wall 12a of the base 12.

The actuator assemblies 22A and 22B are arranged in parallel to a direction intersecting with the bottom wall 12a of the base 12, for example, a perpendicular direction, inside the housing 10. Furthermore, the actuator assemblies 22A and 22B may not be arranged in parallel to the direction intersecting with the bottom wall 12a of the base 12, inside the housing 10. In the example illustrated in FIG. 5, the actuator assembly 22B is positioned between the actuator assembly 22A and the bottom wall 12a of the base 12, inside the housing 10. In other words, the actuator assembly 22A is overlappingly arranged on the actuator assembly 22B that is positioned on the inner surface IWa side of the bottom wall 12a of the base 12. The FPC units 21A and 21B are arranged in parallel to a direction intersecting with the bottom wall 12a of the base 12, for example, a perpendicular direction, inside the housing 10. Furthermore, the FPC units 21A and 21B may not be arranged in parallel to the direction intersecting with the bottom wall 12a of the base 12, inside the housing 10. The FPC unit 21B is positioned between the FPC unit 21A and the bottom wall 12a of the base 12, inside the housing 10. In other words, the FPC unit 21A is overlappingly arranged on the FPC unit 21B that is positioned on the inner surface IWa side of the bottom wall 12a of the base 12.

In the example illustrated in FIG. 5, in the bottom wall 12a of the base 12, for example, a rectangular perforation (through-hole) 12OP is formed on an end portion of the sidewall 12b on one short side wall side. The perforation 12OP is opened to the inner surface IWa and the outer surface OWa of the bottom wall 12a. The FPC unit 21B is arranged on the inner surface IWa of the bottom wall 12a such that the connector 80B1 is inserted into the perforation 12OP. The FPC unit 21A and the FPC unit 21B positioned under the FPC unit 21A are secured to the bottom wall 12a by the screw 54A inserted into the through-holes 53A1 and 53B1, and the screw 54B inserted into the through-holes 53A2 and 53B2. Each of the through-holes 53A1 and 53B1 may be a screw hole that is fitted into the screw 54A. In addition, each of the through-holes 53A2 and 53B2 may be a screw hole that is fitted into the screw 54B. Furthermore, the connector 80B1 may not be inserted into the perforation 12OP.

A concave portion 70 is formed in a region including the perforation 12OP on the outer surface OWa of the bottom wall 12a. In other words, the perforation 12OP is formed on a bottom surface 72 of the concave portion 70 on the outer surface OWa of the bottom wall 12a. The connector unit 82 includes a sealing board 84, a connector 80C1 that is provided on the outer surface 84O of the sealing board 84 on the outer surface OWa side, and a connector 80C2 provided on the other surface (an inner surface) 84I of the sealing board 84 on a side opposite to the connector 80C1 (the inner surface IWa side). The connector 80C1 and the connector 80C2 are electrically connected to each other. The connector unit 82 is arranged such that the connector 80C2 is inserted into the perforation 12OP. The sealing board 84 is fitted into the concave portion 70. The inner surface 84I of the sealing board 84 faces the bottom surface 72 of the concave portion 70, and airtightly adheres to the bottom surface 72 of the concave portion 70 by a sealing material or the like. The connector 80C2 and the connector 80B1 are mechanically connected (for example, fitted) to each other, and thus, are electrically connected to each other. For example, the connector 80C2 and the connector 80B1 are mechanically connected to each other in the perforation 12OP. Furthermore, the connector 80C2 may not be inserted into the perforation 12OP.

In the example illustrated in FIG. 5, the same number of pairs of connectors as the number of actuator assemblies, for example, the connectors 80A and 80B2 and the connectors 80B1 and 80C2 are provided inside the housing 10. In addition, a pair of connectors, for example, the connectors 80C1 and 80D are provided outside the housing 10. The connectors 80A, 80B1, 80B2, 80C1, 80C2, and 80D are arranged in parallel. Furthermore, the connectors 80A, 80B1, 80B2, 80C1, 80C2, and 80D may not be arranged in parallel. The connectors 80A, 80B1, 80B2, and 80C1 are arranged in parallel to the direction intersecting with the bottom wall 12a of the base 12, for example, the perpendicular direction, inside the housing 10. Furthermore, the connectors 80A, 80B1, 80B2, and 80C1 may not be arranged in parallel to the direction the direction intersecting with the bottom wall 12a of the base 12, inside the housing 10. In addition, the connectors 80C2 and 80D are arranged in parallel to the direction intersecting with the bottom wall 12a of the base 12, for example, the perpendicular direction, outside the housing 10. Furthermore, the connectors 80C2 and 80D may not be arranged in parallel to the direction intersecting with the bottom wall 12a of the base 12, inside the housing 10. In the example illustrated in FIG. 5, the connectors 80A, 80B1, 80B2, 80C1, 80C2, and 80D are linearly arranged in parallel to a downward direction in this order. In other words, the connectors 80A, 80B1, 80B2, 80C1, 80C2, and 80D are arranged in parallel to the control circuit board 90 side from the cover side.

Figure 6:
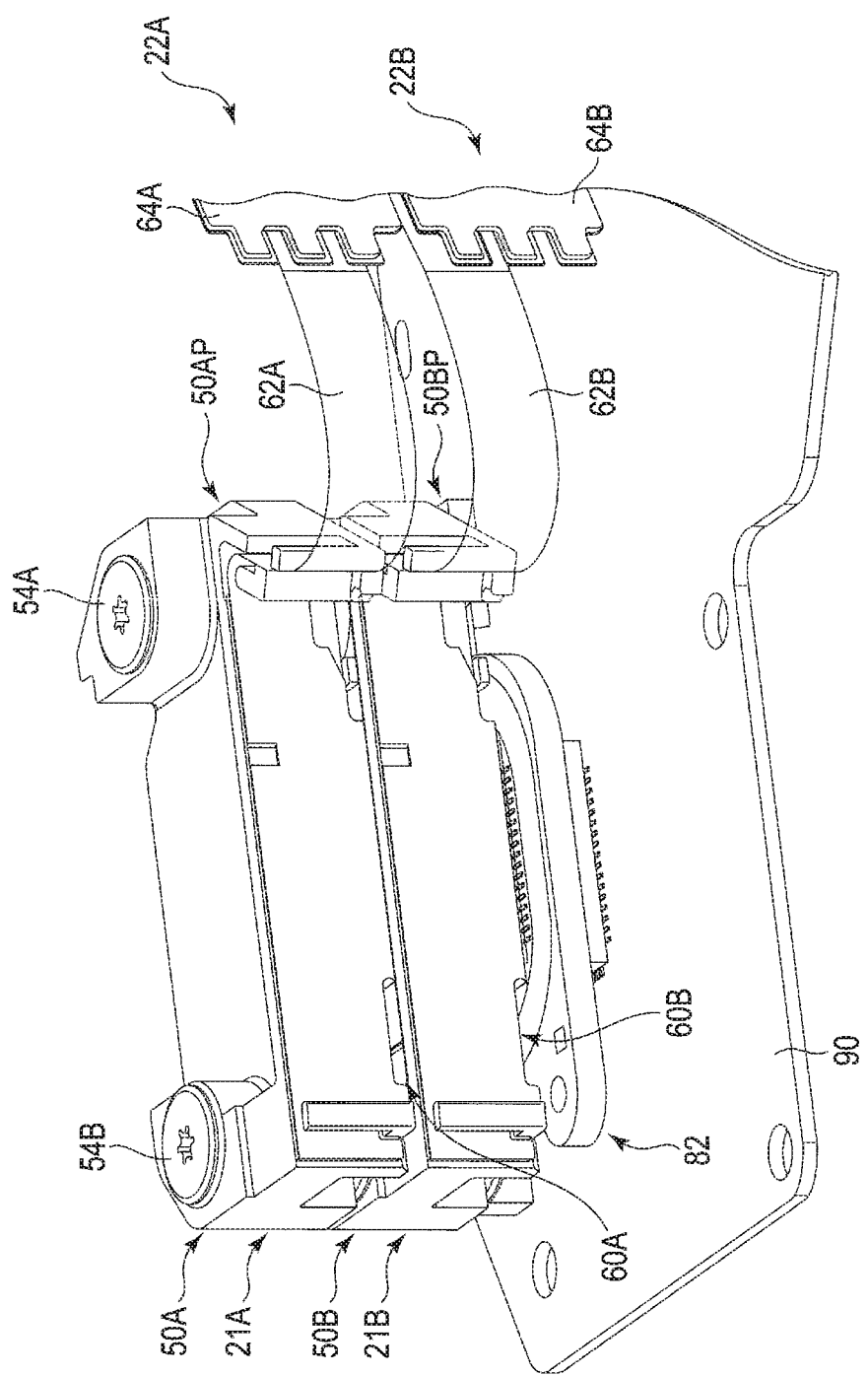
FIG. 6 is a perspective view illustrating one configuration example of an FPC unit.

FIG. 6 is a perspective view illustrating one configuration example of the FPC units 21A and 21B.

The relay portion 62A extends from the side edge of the base portion 60A to the lateral surface of the pedestal 50A, and further extends to the actuator assembly 22A by changing the direction at an approximately right angle. Accordingly, the head 17 that is mounted on the distal end of the actuator assembly 22A is electrically connected to the controller 130 through the wiring and the connection end portion 48c of the flexure 48, the bonding portion 64A, the relay portion 62A, the base portion 60A, the extension portion 63B, and the connectors 80A, 80B1, 80B2, 80C1, 80C2, and 80D.

The relay portion 62B extends from the side edge of the base portion 60B to the lateral surface of the pedestal 50B, and further extends to the actuator assembly 22B by changing the direction at an approximately right angle. Accordingly, the head 17 that is mounted on the distal end of the actuator assembly 22B is electrically connected to the controller 130 through the wiring and the connection end portion 48c of the flexure 48, the bonding portion 64B, the relay portion 62B, the base portion 60B, and the connectors 80A, 80B1, 80B2, 80C1, 80C2, and 80D. The length of the relay portion 62B corresponds to the length of the relay portion 62A. For example, it is desirable that the lengths, the widths, and the thicknesses of the relay portion 62A and the relay portion 62B are the same. The length of the relay portion 62A, for example, corresponds to a length from the bonding portion 64A to the base portion 60A or a length from the bonding portion 64A to the end portion 50AP of the pedestal 50A. The length of the relay portion 62B, for example, corresponds to a length from the bonding portion 64B to the base portion 60B, or a length from the bonding portion 64B to the end portion BP of the pedestal 50B. Furthermore, it is not necessary that the lengths of the relay portion 62A and the relay portion 62B are completely coincident with each other, and the lengths of the relay portion 62A and the relay portion 62B may be the same to the extent of being recognized as the same.

Figure 7:
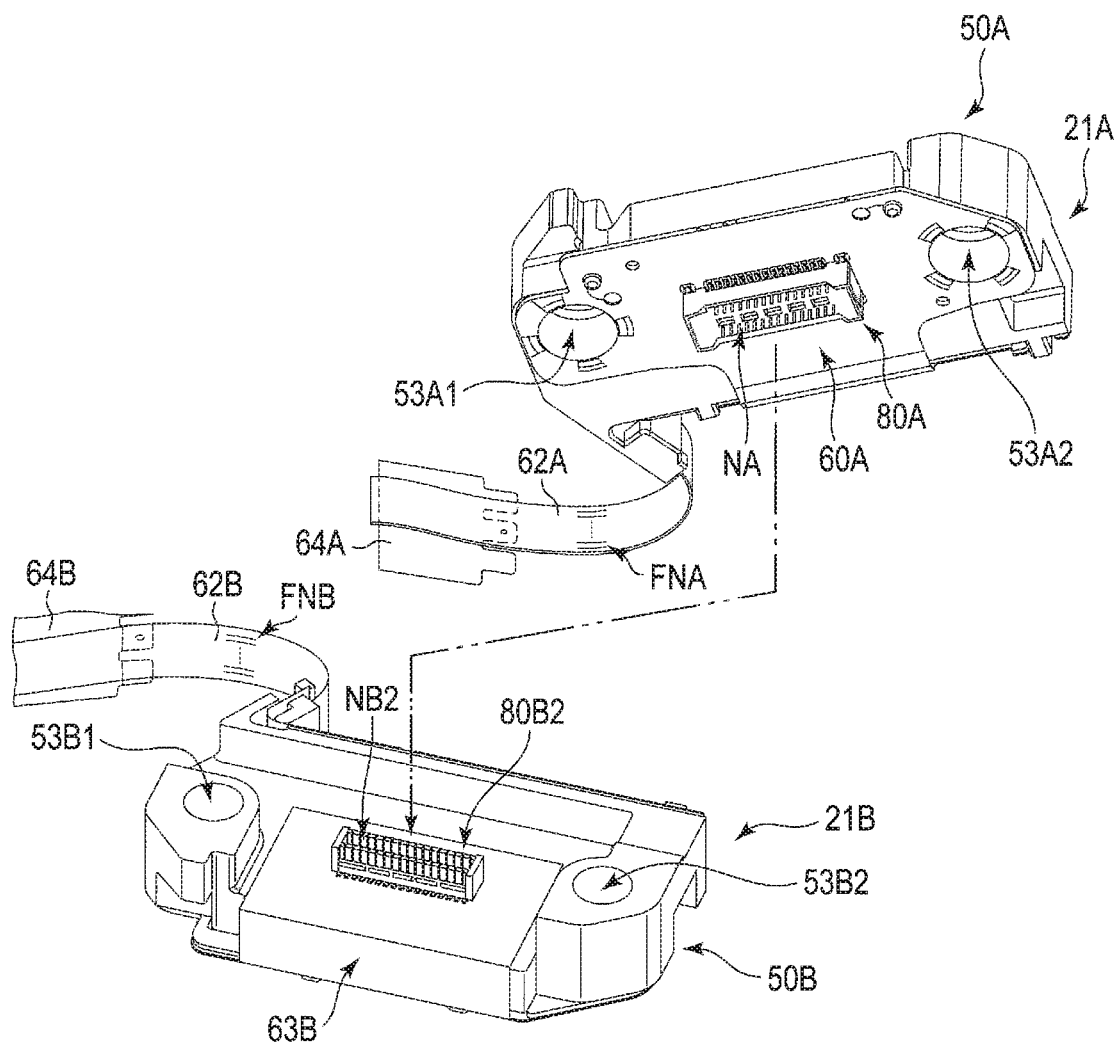
FIG. 7 is a perspective view illustrating one configuration example of a connector.

FIG. 7 is a perspective view illustrating one configuration example of the connectors 80A and 80B2.

The number NB2 of signal lines (conductive terminals or pins) of the connector 80B2 is greater than or equal to the number NA of signal lines (conductive terminals or pins) of the connector 80A. The number NA of signal lines of the connector 80A is less than or equal to the number FNA of signal lines of the FPC unit 21A. Here, the number of signal lines, for example, corresponds to a sum of the number of signal lines for transmitting a signal for writing data on the disk 18 or a signal for reading data from the disk 18 to a head amplifier or the like, the number of signal lines for transmitting a signal for controlling the operation of a microactuator, the number of signal lines for transmitting a signal for controlling the operation of the VCM, the number of power source wirings for supplying a current to each unit, and the number of ground (GND) wirings. In addition, the number of signal lines, for example, corresponds to a sum of the number of conductive terminals (for example, pins of the connector) connected to an end portion of a signal line for transmitting the signal for writing data on the disk 18 or the signal for reading data from the disk 18 to the head amplifier or the like, the number of conductive terminals connected to an end portion of a signal line for transmitting the signal for controlling the operation of the microactuator, the number of conductive terminals connected to an end portion of a signal line for transmitting the signal for controlling the operation of the VCM, the number of conductive terminals connected to an end portion of the power source wiring for supplying a current to each unit, and the number of conductive terminals connected to an end portion of the ground (GND) wiring. Furthermore, the number of signal lines may correspond to a number further including the number of wirings in addition to the number of signal lines, the number of power source wirings, and the number of ground wirings, described above, or may correspond to at least one of the number of signal lines, the number of power source wirings, and the number of ground wiring, described above. The number of conductive terminals (or pins of the connector) may correspond to a number further including the number of terminals in addition to the number of terminals described above, or may correspond to at least one of the number of terminals described above. The number NB2 of signal lines of the connector 80B2 may be less than the number NA of signal lines of the connector 80A. In addition, the number NA of signal lines of the connector 80A may be greater than the number FNA of signal lines of the FPC unit 21A.

The number NA of signal lines of the connector 80A is identical to the number FNA of signal lines of the FPC unit 21A, as an example. In addition, the number NA of signal lines of the connector 80A is identical to the number NB2 of signal lines of the connector 80B2.

Figure 8:
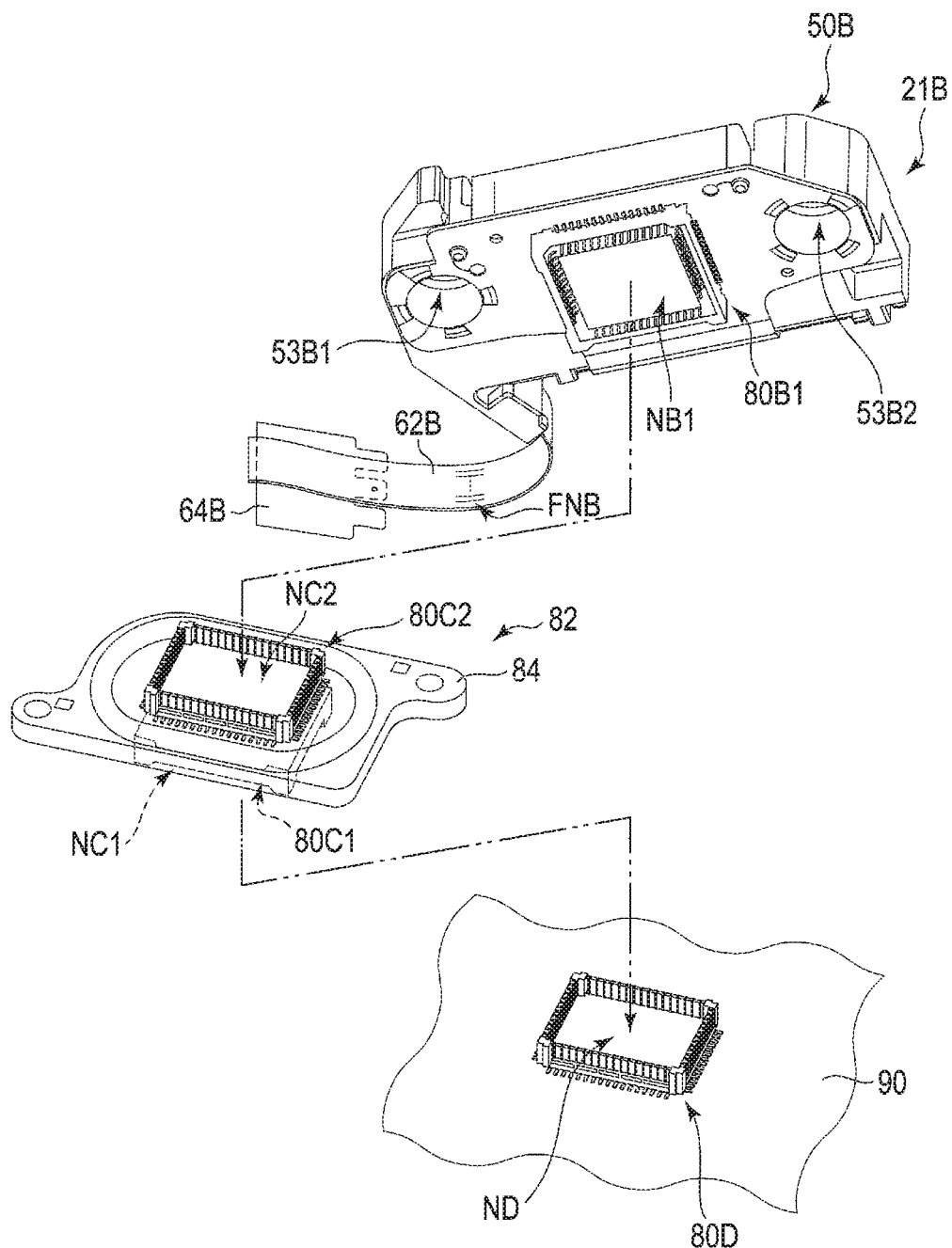
FIG. 8 is a perspective view illustrating one configuration example of the connector.

FIG. 8 is a perspective view illustrating one configuration example of the connectors 80B1, 80B2, 80C1, 80C2, and 80D.

The number NB1 of signal lines of the connector 80B1 is less than a sum of the number FNA of signal lines of the FPC unit 21A and the number FNB of signal lines of the FPC unit 21B. For example, in a case where the ground wiring or the power source wiring in the signal line of the FPC unit 21A and the FPC unit 21B is commonalized, the number NB1 of signal lines of the connector 80B1 is less than a sum of the number FNA of signal lines of the FPC unit 21A and the number FNB of signal lines of the FPC unit 21B. The number NC2 of signal lines of the connector 80C2 is greater than or equal to the number NB1 of signal lines of the connector 80B1. The number NC1 of signal lines of the connector 80C1 is less than or equal to the number NC2 of signal lines of the connector 80C2. For example, in a case where the ground wiring or the power source wiring in the signal line of the FPC unit 21A and the FPC unit 21B is commonalized, the number NB1 of signal lines of the connector 80B1 is less than the number NC2 of signal lines of the connector 80C2. The number ND of signal lines of the connector 80D is greater than or equal to the number NC1 of signal lines of the connector 80C1. Furthermore, the number NB1 of signal lines of the connector 80B1 may be less than the sum of the number FNA of signal lines of the FPC unit 21A and the number FNB of signal lines of the FPC unit 21B. The number NC2 of signal lines of the connector 80C2 may be less than the number NB1 of signal lines of the connector 80B1. The number NC1 of signal lines of the connector 80C1 may be greater than the number NC2 of signal lines of the connector 80C2. The number ND of signal lines of the connector 80D may be less than the number NC1 of signal lines of the connector 80C1. In addition, the number FNA of signal lines of the FPC unit 21A and the number FNB of signal lines of the FPC unit 21B may be identical to each other, or may be different from each other.

The number NA of signal lines of the connector 80A is identical to the number FNA of signal lines of the FPC unit 21A, as an example. The number NA of signal lines of the connector 80A is identical to the number NB2 of signal lines of the connector 80B2. The number FNA of signal lines of the FPC unit 21A is identical to the number FNB of signal lines of the FPC unit 21B. The number NB1 of signal lines of the connector 80B1 corresponds to the sum of the number FNA of signal lines of the FPC unit 21A and the number FNB of signal lines of the FPC unit 21B, and twice the number NB2 of signal lines of the connector 80B2 (or the number NA of signal lines of the connector 80A). The number NC2 of signal lines of the connector 80C2 is identical to the number NB1 of signal lines of the connector 80B1. The number NC1 of signal lines of the connector 80C1 is identical to the number NC2 of signal lines of the connector 80C2. The number ND of signal lines of the connector 80D is identical to the number NC1 of signal lines of the connector 80C1.

Figure 9:
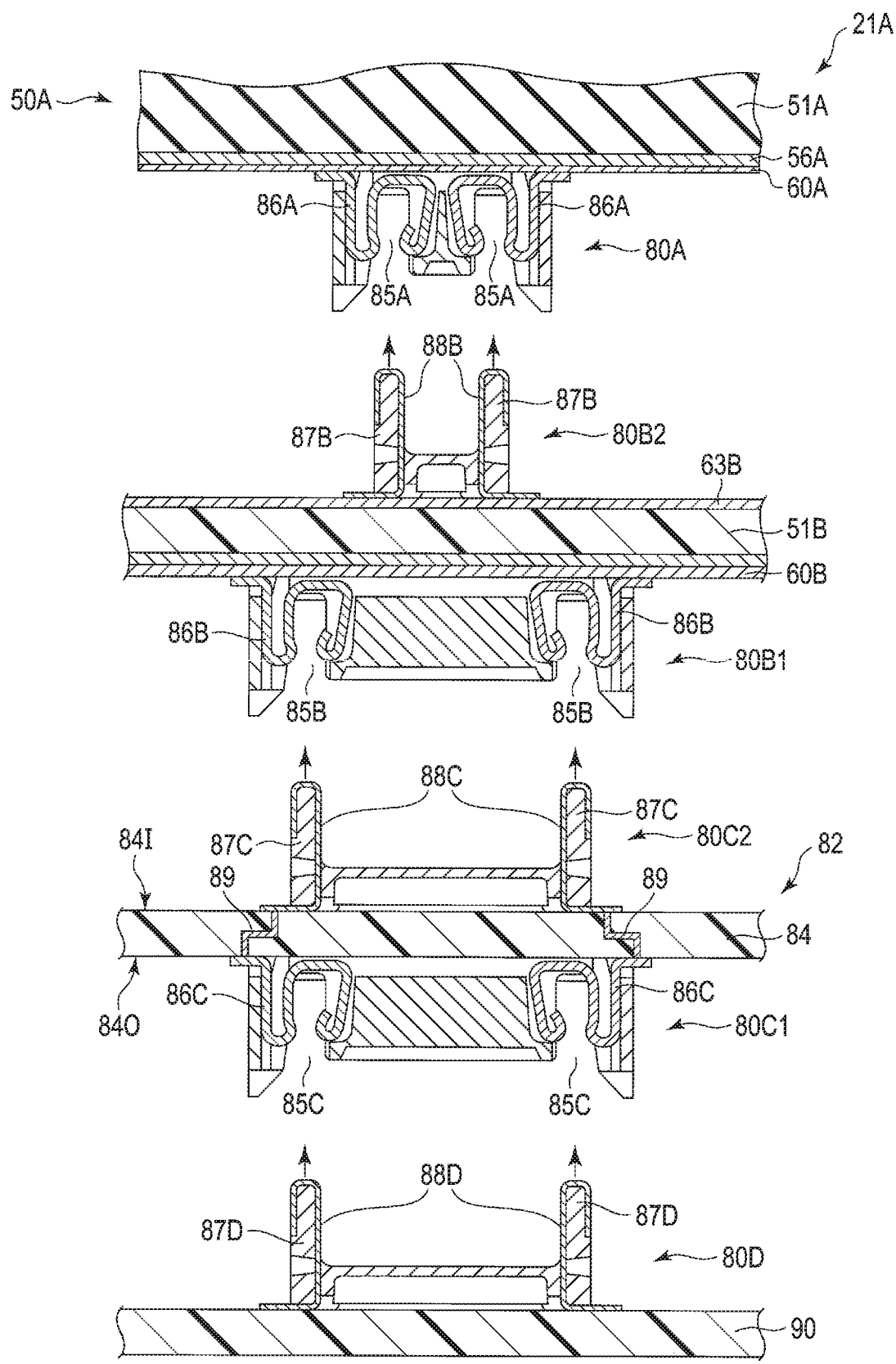
FIG. 9 is a sectional view illustrating one configuration example of the connector.

FIG. 9 is a sectional view illustrating one configuration example of the connectors 80A, 80B1, 80B2, 80C1, 80C2, and 80D.

In the example illustrated in FIG. 9, the connector 80A is a concave connector. The connector 80A includes at least one concave portion 85A, and at least one conductive terminal 86A provided in the concave portion 85A. The conductive terminal 86A is electrically connected to the base portion 60A. For example, the conductive terminal 86A is in contact with the base portion 60A. The connector 80B2 is a convex connector. The connector 80B2 includes at least one convex portion 87B, and at least one conductive terminal 88B provided on the convex portion 87B. The conductive terminal 88B is electrically connected to the extension portion 63B. For example, the conductive terminal 88B is in contact with the extension portion 63B. The convex portion 87B is inserted and fitted into concave portion 85A, and thus, the connector 80A and the connector 80B1 are mechanically fitted (or connected) to each other. In addition, the convex portion 87B is mechanically fitted into the concave portion 85A, and thus, the conductive terminal 86A and the conductive terminal 88B are in contact with each other, and the connector 80A and the connector 80B1 are electrically connected to each other. The connector 80A is fitted into the connector 80B2, and thus, configures a two-piece connector. Furthermore, the connector 80A may be a convex connector, and the connector 80B2 may be a concave connector.

In the example illustrated in FIG. 9, the connector 80B1 is a concave connector. The connector 80B1 includes at least one concave portion 85B, and at least one conductive terminal 86B provided on the concave portion 85B. The conductive terminal 86B is electrically connected to the base portion 60B. For example, the conductive terminal 86B is electrically connected to the base portion 60B. The connector 80C2 is a convex connector. The connector 80C2 includes at least one convex portion 87C, and at least one conductive terminal 88C provided on the convex portion 87C. The conductive terminal 88C, for example, is in contact with the inner surface 84I of the sealing board 84. The convex portion 87C is inserted and fitted into the concave portion 85B, and thus, the connector 80B1 and the connector 80C2 are mechanically fitted (or connected) to each other. In addition, the convex portion 87C is mechanically fitted into the concave portion 85B, and thus, the conductive terminal 86B and the conductive terminal 88C are contact with each other, and the connector 80B1 and the connector 80C2 are electrical connected to each other. The connector 80B1 is fitted into the connector 80C2, and thus, configures a two-piece connector. Furthermore, the connector 80B1 may be a convex connector, and the connector 80C2 may be a concave connector.

In the example all illustrated in FIG. 9, the connector 80C1 is a concave connector. The connector 80C1 includes at least one concave portion 85C, and at least one conductive terminal 86C provided on the concave portion 85C. The conductive terminal 86 and the conductive terminal 88C are electrically connected to each other through a conductive layer formed in the sealing board 84 or a conductive bus 89 formed in the through-hole or the like. The conductive terminal 86, for example, is in contact with the outer surface 84O of the sealing board 84. The connector 80D is a convex connector. The connector 80D includes at least one convex portion 87D, and at least one conductive terminal 88D provided on the convex portion 87D. The conductive terminal 88D is electrically connected to the control circuit board 90. The conductive terminal 88D, for example, is in contact with the control circuit board 90. The convex portion 87D is inserted and fitted into the concave portion 85C, and thus, the connector 80C1 and the connector 80D are mechanically fitted (or connected) to each other. In addition, the convex portion 87D is mechanically fitted into the concave portion 85C, and thus, the conductive terminal 86C and the conductive terminal 88D are in contact with each other, and the connector 80C1 and the connector 80D are electrically connected to each other. The connector 80C1 fitted into the connector 80D, and thus, configures a two-piece connector. Furthermore, the connector 80C1 may be a convex connector, and the connector 80D may be a concave connector. It is described that the connector 80D is a fitting-type connector, but the connector 80D may be a pad-type connector, or may be a compression-type connector. For example, in a case where the connector 80D is the fitting-type connector, at is desirable that the connector unit 82 includes only one connector, outside the housing 10. In a case where the connector 80D is the pad-type connector or the compression-type connector, the connector unit 82 may include a plurality of connectors, outside the housing 10. In addition, it is described that each of the connectors 80A, 80B1, 80B2, 80C1, and 80C2 is a fitting-type connector, but each of the connectors 80A, 80B1, 80B2, 80C1, and 80C2 may be a pad-type connector, or may be a compression-type connector.

According to the present embodiment, the magnetic disk drive 1 includes the housing 10, the actuator assemblies 22A and 22B provided inside the housing 10, the FPC units 21A and 21B provided inside the housing 10, the connector unit 82 provided outside the housing 10, and the control circuit board 90 provided outside the housing 10. The FPC unit 21A integrally includes the base portion 60A provided with the connector 80A, the relay portion 62A connecting the base portion 60A and the bonding portion 64A to each other, and the bonding portion 64A electrically connected to the actuator assembly 22A. The FPC unit 21B integrally includes the base portion 60B provided with the connector 80B1, the relay portion 62B connecting the base portion 60B and the bonding portion 64B to each other, the extension portion 63B extending from the base portion 60B and provided with the connector 80B2, and the bonding portion 64B electrically connected to the actuator assembly 22B. The connector unit 82 includes the sealing board 84 airtightly sealing the perforation 12OP that is formed in the bottom wall 12a of the housing 10, the connector 80C1 provided on the outer surface of the sealing board 84, and the connector 80C2 provided on the inner surface of the sealing board 84. The control circuit board 90 includes the connector 80D provided on the inner surface, and the controller 130 controlling the operation of the head 17 or the spindle motor 20. When the magnetic disk drive 1 is assembled, the connector 80A and the connector 80B2 are fitted into each other, and thus, the FPC unit 21A and the FPC unit 21B are electrically connected to each other. The connector 80B1 and the connector 80C2 are fitted into each other, and thus, the FPC unit 21B and the connector unit 82 are electrically connected to each other. The connector 80C1 and the connector 80D are fitted into each other, and thus, the connector unit 82 and the control circuit board 90 are electrically connected to each other. According to the configuration of the magnetic disk drive 1 as described above, it is possible to separately handle the actuator assembly 22A to which the FPC unit 21A is bonded, and the actuator assembly 22B to which the FPC unit 21B is bonded. For this reason, for example, in a case where the suspension assembly 30 is attached to the actuator assemblies 22A and 22B or a case where the actuator assemblies 22A and 22B are attached to the bearing unit 28, it is possible to prevent the actuator assemblies 22A and 22B from acting on each other and from damaging each other. Therefore, the magnetic disk drive 1 is capable of improving reliability.

Next, a magnetic disk drive according to a modification example of the embodiment described above will be described. In the modification example, the same reference symbols will be applied to the same portions as those of embodiment described above, and the detailed description thereof will be omitted.

Modification Example 1

A magnetic disk drive 1 of Modification Example 1 is different from that of the embodiment described above in the configuration of the connector.

FIG. 10 as a sectional view pictorially illustrating one configuration example FPC units 21A and 21B, a connector unit 82, and a control circuit board 90 according to Modification Example 1.

In the example illustrated in FIG. 10, each of the FPC units 21A and 21B faces a bottom wall 12a of a base 12.

In the example illustrated in FIG. 10, the FPC unit 21A is arranged on an inner surface IWa of the bottom wall 12a such that a connector 80A is inserted into a perforation 12OP described above. Furthermore, the connector 80A may not be inserted into the perforation 12OP.

In the example illustrated in FIG. 10, the FPC unit 21B integrally includes a base portion 60B, a relay portion 62B, and a bonding portion 64B. An electronic component such as a plurality of capacitors (not illustrated) and a connector 80B3 is mounted on the outer surface of the base portion 60B, and is electrically connected to wiring or the like (not illustrated). The connector 80B3, for example, is a concave connector. Furthermore, the connector 80B3 may be a convex connector. The FPC unit 21B is arranged on the inner surface IWa of the bottom wall 12a such that the connector 80B3 is inserted into the perforation 12OP described above. Furthermore, the connector 80B3 may not be inserted into the perforation 12OP.

In the example illustrated in FIG. 10, the connector unit 82 includes a sealing board 84, a connector 80C3 provided on an outer surface 84O of the sealing board 84, and a connector 80C4 provided on an inner surface 84I of the sealing board 84. The connector 80C3 is a concave connector, and the connector 80C4 is a convex connector. Furthermore, the connector 80C3 may be a convex connector, and the connector 80B4 may be a concave connector. The connector 80C3 and the connector 80C4 are electrically connected to each other through a conductive bus 89. The connector unit 82 is arranged such that the connector 80C4 is inserted into the perforation 12OP, outside the housing 10. The connector 80C4 and the connectors 80A and 80B3 are mechanically connected (for example, fitted) to each other, and thus, are electrically connected to each other. For example, the connector 80C4 and the connector 80A, and the connector 80C4 and the connector 80B3 are mechanically connected to each other in the perforation 12OP. The connector 80C3 and the connector 80D are mechanically connected (for example, fitted) to each other, and thus, are electrically connected to each other. Furthermore, the connector 80C4 may not be inserted into the perforation 12OP.

In the example illustrated in FIG. 10, the same number of pairs of connectors as the number of actuator assemblies, for example, the connectors 80A and 80C4 and the connectors 80B3 and 80C4 are provided inside the housing 10. In addition, a pair of connectors, for example, the connectors 80C3 and 80D are provided outside the housing 10.

In number NB3 of signal lines of the connector 80B3 is less than or equal to the number FNB of signal lines of the FPC unit 21B. The number NC4 of signal lines of the connector 80C4 is greater than or equal to a sum of the number NA of signal lines of the connector 80A and the number NB3 of signal lines of the connector 80B3. The number NC3 of signal lines of the connector 80C3 is less than or equal to the number NC4 of signal lines of the connector 80C4. For example, in a case where the ground wiring or the power source wiring in the signal line of the FPC unit 21A and the FPC unit 21B is commonalized, the number NC3 of signal lines of the connector 80C3 is less than the number NC4 of signal lines of the connector 80C4. The number ND of signal lines of the connector 80D is greater than or equal to the number NC3 of signal lines of the connector 80C3. Furthermore, the number NB3 of signal lines of the connector 80B3 may be greater than the number FNB of signal lines of the FPC unit 21B. The number NC4 of signal lines of the connector 80C4 may be less than the sum of the number NA of signal lines of the connector 80A and the number NB3 of signal lines of the connector 80B3. The number NC3 of signal lines of the connector 80C3 may be greater than the number NC4 of signal lines of the connector 80C4. The number ND of signal lines of the connector 80D may be less than the number NC3 of signal lines of the connector 80C3.

The number NA of signal lines of the connector 80A is identical to the number FNA of signal lines of the FPC unit 21A, as an example. The number NB3 of signal lines of the connector 80B3 is identical to the number FNB of signal lines of the FPC unit 21B. The number FNA of signal lines of the FPC unit 21A is identical to the number FNB of signal lines of the FPC unit 21B. The number NC4 of signal lines of the connector 80C4 corresponds to the sum of the number NA of signal lines of the connector 80A and the number NB3 of signal lines of the connector 80B3, and is twice the number NA of signal lines of toe connector 80A (or the number NB3 of signal lines of the connector 80B3). That is, the number NC4 of signal lines or the connector 80C4 is twice the number FNA of signal lines of the FPC unit 21A (or the number FNB of signal lines of the FPC unit 21B). The number NC4 of signal lines of the connector 80C4 is identical to the number NC3 of signal lines of the connector 80C3. The number ND of signal lines of the connector 80D is identical to the number NC4 of signal lines of the connector 80C4.

According to Modification Example 1, the magnetic disk drive 1 includes the FPC units 21A and 21B that respectively are connected to the connector of the connector unit 82, inside the housing 10. For this reason, it is possible to separately handle the FPC unit 21A and the FPC unit 21B. Therefore, the magnetic disk drive 1 is capable of improving reliability.

Modification Example 2

A magnetic disk drive 1 of Modification Example 2 is different from that of the embodiment described above in the configuration of the connector.

FIG. 11 is a sectional view pictorially illustrating one configuration example of FPC units 21A and 21B, a connector unit 82, and a control circuit board 90 according to Modification Example 2.

In the example illustrated in FIG. 11, each of the FPC units 21A and 21B faces a bottom wall 12a of a base 12.

In the example illustrated in FIG. 11, the FPC unit 21A is arranged on an inner surface IWa of the bottom wall 12a such that a connector 80A is inserted into a perforation 12OP described above. Furthermore, the connector 80A may not be inserted into the perforation 12OP.

In the example illustrated in FIG. 11, the FPC unit 21B integrally includes a base portion 60B in which the connector 80B3 is mounted on an outer surface, a relay portion 62B, and a bonding portion 64B.

In the example illustrated in FIG. 11, the connector unit 82 includes a sealing board 84, a connector 80C1 provided on an outer surface 84O of the sealing board 84, and a connector 80C5 and a connector 80C6 provided on an inner surface 84I of the sealing board 84. The connectors 80C5 and 80C6 are a convex connector. Furthermore, the connectors 80C5 and 80C6 may be a concave connector. The connector 80C2 and the connectors 80C5 and 80C6 are electrically connected to each other through a conductive bus 89. The connector unit 82 is arranged such that the connectors 80C5 and 80C6 are inserted into the perforation 12OP, outside the housing 10. The connector 80C5 and the connector 80A are mechanically connected (for example, fitted) to each other, and thus, are electrically connected to each other. For example, the connectors 80C5 and 80A are mechanically connected to each other in the perforation 12OP. The connector 80C6 and the connector 80B3 are mechanically connected (for example, fitted) to each other, and thus, are electrically connected to each other. For example, the connectors 80C6 and 80B3 are mechanically connected to each other in the perforation 12OP. Furthermore, the connectors 80C5 and 80C6 may not be inserted into the perforation 12OP.

In the example illustrated in FIG. 11, the same number of pairs of connectors as the number of actuator assemblies, for example, the connectors 80A and 80C5 and the connectors 80B3 and 80C6 are provided inside the housing 10. In addition, a paid of connectors, for example, the connectors 80C2 and 80D are provided outside the housing 10.

The number NC5 of signal lines of the connector 80C5 is greater than or equal to the number NA of signal lines of the connector 80A. The number NC6 of signal lines of the connector 80C6 is greater than or equal to the number NB3 of signal lines of the connector 80B3. The number of signal lines 80C1 of the connector 80C2 is less than or equal to a sum of the number NA of signal lines of the connector 80A and the number NB3 of signal lines of the connector 80B3. For example, in a case where the ground wiring or the power source wiring in the signal line of the FPC unit 21A and the FPC unit 21B is commonalized, the number NC1 of signal lines of the connector 80C1 is less than the sum of the number NA of signal lines of the connector 80A and the number NB3 of signal lines of the connector 80C3. The number ND of signal lines of the connector 80D is greater than the number NC1 of signal lines of the connector 80C1. Furthermore, the number NC5 of signal lines of the connector 80C5 may be less than the number NA of signal lines of the connector 80A. The number NC6 of signal lines of the connector 80C6 may be less than the number NB3 of signal lines of the connector 80B3. The number of signal lines 80C1 of the connector 80C2 may be greater than the sum of the number NA of signal lines of the connector 80A and the number NB3 of signal lines of the connector 80B3. The number ND of signal lines of the connector 80D may be less than the number NC1 of signal lines of the connector 80C1.

The number NA of signal lines of the connector 80A is identical to the number FNA of signal lines of the FPC unit 21A, as an example. The number NB3 of signal lines of the connector 80B3 is identical to the number FNB of signal lines of the FPC unit 21B. The number FNA of signal lines of the FPC unit 21A is identical to the number FNB of signal lines of the FPC unit 21B. The number NC5 of signal lines of the connector 80C5 is identical to the number NA of signal lines of the connector 80A. That is, the number NC5 of signal lines of the connector 80C5 is identical to the number FNA of signal lines of the FPC unit 21A. The number NC6 of signal lines of the connector 80C6 is identical to the number NB3 of signal lines of the connector 80C3. That is, the number NC6 of signal lines of the connector 80C6 is identical to the number FNB of signal lines of the FPC unit 21B. The number NC1 of signal lines of the connector 80C1 corresponds to the sum of the number NA of signal lines of the connector 80A and the number NB3 of signal lines of the connector 80B3, and is twice the number NA of signal lines of the connector 80A (or the number NB3 of signal lines of the connector 80B3). That is, the number NC1 of signal lines of the connector 80C1 is twice the number FNA of signal lines of the FPC unit 21A (or the number FNB of signal lines of the FPC unit 21B. The number ND of signal lines of the connector 80D is identical to the number NC1 of signal lines of the connector 80C1.

According to Modification Example 2, the magnetic disk drive 1 includes the FPC unit 21A connected to one connector of the connector unit 82 in the housing 10, and the FPC unit 21B connected to one connector of the connector unit 82 in the housing 10 that is different from the connector to which the FPC unit 21A is connected. For this reason, it is possible to separately handle the FPC unit 21A and the FPC unit 21B. Therefore, the magnetic disk drive 1 is capable of improving reliability.

Furthermore, in the embodiment described above and the modification examples described above, the housing 10 is sealed with low density gas (inert gas) of which the density is lower than that of the air, for example, helium, but the configurations of the embodiment and the modification examples described above can be applied to a general magnetic disk drive that is not sealed with the inert gas. The general magnetic disk drive, for example, has a structure in which an upper end opening of the base is blocked by one top cover but not two covers of the inner cover and the outer cover. In this case, the magnetic disk drive may not include the connector unit 82, or may have a configuration in which the connector connected to the FPC unit is provided on each of the inner surface and the outer surface of the bottom wall 12a.

In addition, in the illustrated configuration or the like that has been described above, it is premised on a width of 101.85 mm, a length of 147 mm, and a height of 26.1 mm that are a device configuration of 3.5-inch HDD, the height may be 42 mm, 84 mm, or a dimension other than the dimension described above, insofar as the disk 18 as mounted on one spindle motor 2. In addition, the same applies to the width and the length.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive, comprising:
a housing that includes a bottom wall;
a magnetic disk that is contained in the housing;
a first head and a second head configured to write data to the magnetic disk, and read data from the magnetic disk;
a first actuator assembly that is provided inside the housing, and includes the first head;
a second actuator assembly that is positioned between the bottom wall and the first actuator assembly in the housing, and includes the second head;
a first flexible print circuit board that is electrically connected to the first actuator assembly in the housing, and includes a first connector;
a second flexible print circuit board that is electrically connected to the second actuator assembly in the housing, and includes a second connector; and
a control circuit board that is provided outside the housing, and includes a third connector electrically connected to the first connector and the second connector, wherein
the second flexible print circuit board further includes a fourth connector that is electrically connected to the first connector and the second connector.

2. The magnetic disk drive according to claim 1, wherein the fourth connector is mechanically connected to the first connector.

3. The magnetic disk drive according to claim 2, further comprising:
a fifth connector that is provided inside the housing, and is mechanically connected to the second connector; and
a sixth connector that is provided outside the housing, and is electrically connected to the fifth connector,
wherein the sixth connector is mechanically connected to the third connector.

4. The magnetic disk drive according to claim 3, further comprising:
a sealing board that includes a first surface positioned inside the housing, and a second surface positioned outside the housing on a side opposite to the first surface,
wherein the housing includes a through-hole that penetrates through the bottom wall,
the sealing board adheres to an outside of the bottom wall to airtightly block the through-hole,
the fifth connector is provided on the first surface, and is inserted into the through-hole, and
the sixth connector is provided on the second surface.

5. The magnetic disk drive according to claim 4, wherein the number of terminals of the sixth connector is less than or equal to a sum of the number of terminals of the first connector and the number of terminals of the second connector.

6. A magnetic disk drive, comprising:
a housing that includes a bottom wall;
a magnetic disk that is contained in the housing;
a first head and a second head configured to write data to the magnetic disk, and read data from the magnetic disk;
a first actuator assembly that is provided inside the housing, and includes the first head;
a second actuator assembly that is positioned between the bottom wall and the first actuator assembly in the housing, and includes the second head;
a first flexible print circuit board that is electrically connected to the first actuator assembly in the housing, and includes a first connector;
a second flexible print circuit board that is electrically connected to the second actuator assembly in the housing, and includes a second connector;
a control circuit board that is provided outside the housing, and includes a third connector electrically connected to the first connector and the second connector;
a fourth connector that is provided inside the housing, and is electrically connected to the first connector and the second connector; and
a fifth connector that is provided outside the housing, and is electrically connected to the third connector and the fourth connector.

7. The magnetic disk drive according to claim 6,
wherein the fourth connector is mechanically connected to the first connector and the second connector, and
the fifth connector is mechanically connected to the third connector.

8. The magnetic disk drive according to claim 7, further comprising:
a sealing board that includes a first surface positioned inside the housing, and a second surface positioned outside the housing on a side opposite to the first surface,
wherein the housing includes a through-hole that penetrates through the bottom wall,
the sealing board adheres to an outside of the bottom wall to airtightly block the through-hole,
the fourth connector is provided on the first surface, and is inserted into the through-hole, and
the fifth connector is provided on the second surface.

9. The magnetic disk drive according to claim 8,
wherein the number of terminals of the fourth connector corresponds to a sum of the number of terminals of the first connector and the number of terminals of the second connector, and
the number of terminals of the fifth connector is less than or equal to the number of terminals of the fourth connector.

10. A magnetic disk drive, comprising:
a housing that includes a bottom wall;
a magnetic disk that is contained in the housing;
a first head and a second head configured to write data to the magnetic disk, and read data from the magnetic disk;
a first actuator assembly that is provided inside the housing, and includes the first head;
a second actuator assembly that is positioned between the bottom wall and the first actuator assembly in the housing, and includes the second head;
a first flexible print circuit board that is electrically connected to the first actuator assembly in the housing, and includes a first connector;
a second flexible print circuit board that is electrically connected to the second actuator assembly in the housing, and includes a second connector;
a control circuit board that is provided outside the housing, and includes a third connector electrically connected to the first connector and the second connector;
a fourth connector that is provided inside the housing, and is electrically connected to the first connector;

a fifth connector that is provided inside the housing, and is electrically connected to the second connector; and a sixth connector that is provided outside the housing, and is electrically connected to the third connector, the fourth connector, and the fifth connector.

11. The magnetic disk drive according to claim 10, wherein the fourth connector is mechanically connected to the first connector, the fifth connector is mechanically connected to the second connector, and the sixth connector is mechanically connected to the third connector.

12. The magnetic disk drive according to claim 11, further comprising:

a sealing board that includes a first surface positioned inside the housing, and a second surface positioned outside the housing on a side opposite to the first surface, wherein the housing includes a through-hole that penetrates through the bottom wall, the sealing board adheres to an outside of the bottom wall to airtightly block the through-hole, the fourth connector and the fifth connector are provided on the first surface, and are inserted into the through-hole, and the sixth connector is provided on the second surface.

* * * * *